(12) United States Patent  
Kumahashi

(10) Patent No.: US 11,785,152 B2  
(45) Date of Patent: Oct. 10, 2023

(54) IMAGE FORMING APPARATUS IN WHICH A DESIRED FUNCTION CAN BE SELECTIVELY EXECUTED, METHOD OF CONTROLLING THE SAME, AND STORAGE MEDIUM

(71) Applicant: CANON KABUSHIKI KAISHA, Tokyo (JP)

(72) Inventor: Shu Kumahashi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/680,865

(22) Filed: Feb. 25, 2022

(65) Prior Publication Data

US 2022/0286568 A1 Sep. 8, 2022

(30) Foreign Application Priority Data

Mar. 3, 2021 (JP) ................................ 2021-033731

(51) Int. Cl.
*H04N 1/00* (2006.01)
*H04N 1/44* (2006.01)

(52) U.S. Cl.
CPC ..... *H04N 1/00503* (2013.01); *H04N 1/00411* (2013.01); *H04N 1/00474* (2013.01); *H04N 1/00204* (2013.01); *H04N 1/4433* (2013.01)

(58) Field of Classification Search
CPC ................................ H04N 1/00503

USPC .......................................... 358/1.15
See application file for complete search history.

(56) References Cited

U.S. PATENT DOCUMENTS

| 10,506,122 | B2 | 12/2019 | Kogure | |
|---|---|---|---|---|
| 2018/0048781 | A1* | 2/2018 | Kogure | H04N 1/32625 |
| 2019/0158702 | A1* | 5/2019 | Shirakawa | H04N 1/00384 |
| 2022/0385788 | A1* | 12/2022 | Kumahashi | G06F 21/6218 |

FOREIGN PATENT DOCUMENTS

JP 2018025909 A 2/2018

* cited by examiner

*Primary Examiner* — Jacky X Zheng
(74) *Attorney, Agent, or Firm* — ROSSI, KIMMS & McDOWELL LLP

(57) ABSTRACT

An image forming apparatus having a plurality of functions registers, as setting information on a display button corresponding to the application, setting information including settings with which at least two of the plurality of functions are used, generates the display button corresponding to the application, the display button corresponding to each function included in the setting information, based on the registered setting information, and displays the generated display button on a screen. When the display button is selected via the screen, the image forming apparatus executes the application corresponding to the selected display button, based on the setting information corresponding to the selected button.

17 Claims, 9 Drawing Sheets

FIG. 8

| CLOUD SERVICE \ FUNCTION | SCAN | PRINT |
|---|---|---|
| CLOUD SERVICE 1 | SCAN ICON OF CLOUD SERVICE 1 | PRINT ICON OF CLOUD SERVICE 1 |
| CLOUD SERVICE 2 | SCAN ICON OF CLOUD SERVICE 2 | PRINT ICON OF CLOUD SERVICE 2 |
| CLOUD SERVICE 3 | SCAN ICON OF CLOUD SERVICE 3 | PRINT ICON OF CLOUD SERVICE 3 |

FIG. 10

| BUTTON SETTING NAME | BUTTON SETTING ID | SCAN BUTTON ID | PRINT BUTTON ID |
|---|---|---|---|
| BUTTON 1 | 1 | 11 | 12 |
| BUTTON 2 | 2 | 21 | 22 |
| BUTTON 3 | 3 | 31 | 32 |

IMAGE FORMING APPARATUS IN WHICH A DESIRED FUNCTION CAN BE SELECTIVELY EXECUTED, METHOD OF CONTROLLING THE SAME, AND STORAGE MEDIUM

BACKGROUND OF THE INVENTION

Field of the Invention

The present invention relates to an image forming apparatus, a method of controlling the same, and a storage medium.

Description of the Related Art

Japanese Patent Laid-Open No. 2018-25909 describes a technique for displaying, even in an environment with limited resources, display items related to an application under an appropriate condition on an information processing apparatus, functions of which can be extended by installing an extension application.

Such application displays a single icon or respective single icons for each setting information registered in the application. This would not involve any inconvenience if the application can only execute a single function of the information processing apparatus. However, for applications that selectively execute one of a plurality of functions, which function of the plurality of functions is executed needs to be selectable. For example, with an application that can cooperate with a cloud storage service, possible cases include a case where data is uploaded to the cloud storage, a case where data stored in the cloud storage is downloaded for printing for example, and the like. In this case, it is preferable that the user can easily select a use case from such use cases to execute, after the user has registered setting information for the selection of these use cases in the application.

SUMMARY OF THE INVENTION

An aspect of the present invention is to eliminate the above-mentioned problem with conventional technology.

A feature of the present invention is to provide a technique enabling easy selection of a function desired to be executed by a user, with an application that can selectively execute one of a plurality of functions.

According to a first aspect of the present invention, there is provided an image forming apparatus having a plurality of functions and being configured to execute an application, wherein at least one processor and at least one memory are configured to: register, as setting information on a display button corresponding to the application, setting information including settings with which at least two of the plurality of functions are used; generate the display button corresponding to the application, the display button corresponding to each function included in the setting information, based on the registered setting information; display the generated display button on a first screen; and control to execute, when the display button is selected via the first screen, the application corresponding to the selected display button, based on the setting information corresponding to the selected button.

According to a second aspect of the present invention, there is provided a method of controlling an image forming apparatus having a plurality of functions and configured to execute an application, the method comprising: registering, as setting information on a display button corresponding to the application, setting information including setting with which at least two of the plurality of functions are used; generating the display button corresponding to the application, the display button corresponding to each function included in the setting information, based on the registered setting information; displaying the generated display button on a first screen; and controlling to execute, when the display button is selected via the first screen, the application corresponding to the selected display button, based on the setting information corresponding to the display button.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram for describing an example of a table for storing the setting information on an icon corresponding to the cloud service, and the scanning function and the printing function of the image forming apparatus according to the embodiment.

FIG. 10 is a diagram for describing an example of a list of setting information pieces on the buttons of the cloud cooperative printing and scanning application displayed on the home screen of the image forming apparatus according to the embodiment and the IDs of the buttons displayed on the home screen.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
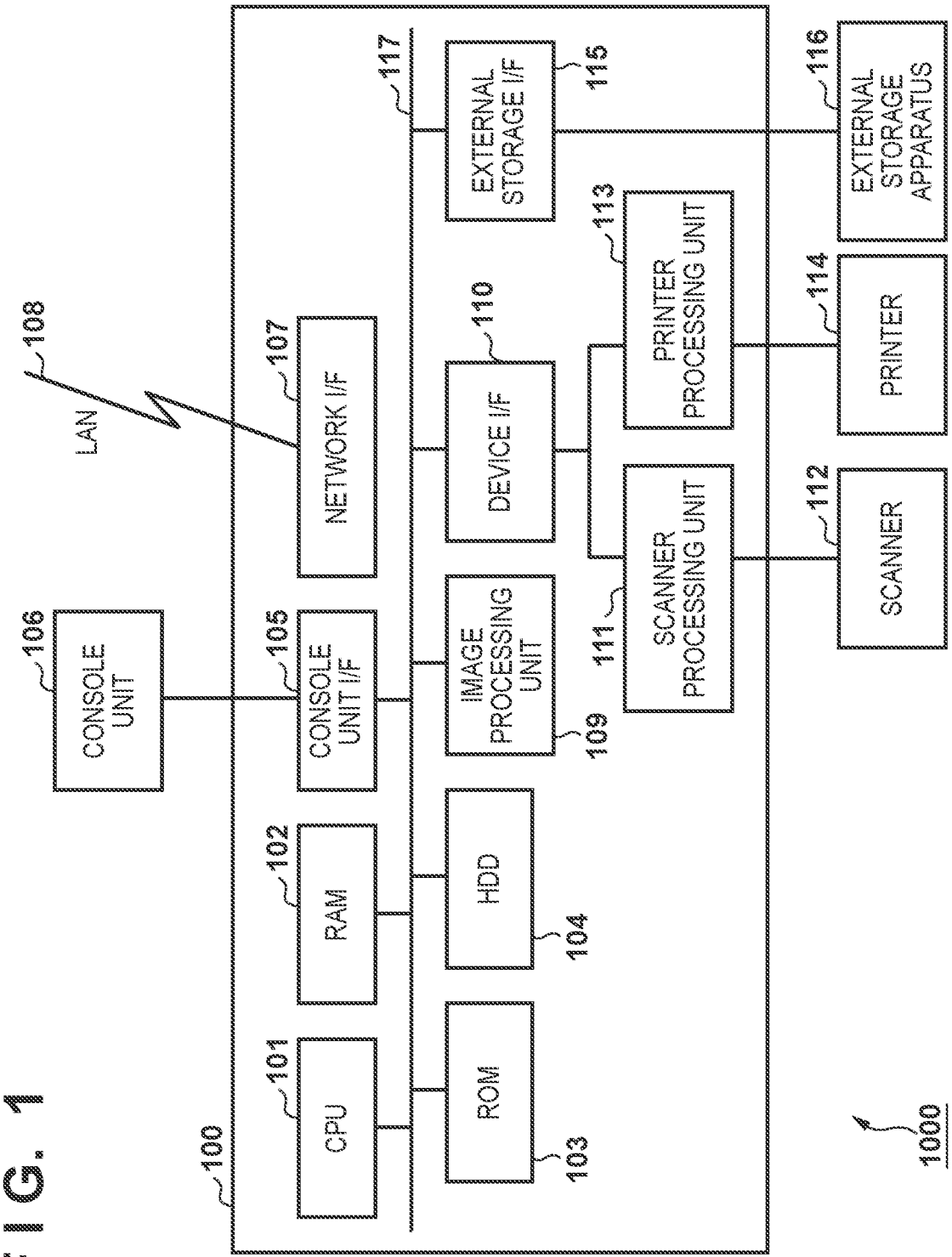
FIG. 1 is a block diagram for describing a hardware configuration of an image forming apparatus according to an embodiment of the present invention.

FIG. 1 is a block diagram for describing a hardware configuration of an image forming apparatus 1000 according to an embodiment of the present invention. In the embodiment, as illustrated in FIG. 1, the image forming apparatus 1000 is implemented as what is known as a multi-function peripheral (MFP) having a plurality of functions, such as a scanning function and a printing function for example, being integrated.

The image forming apparatus 1000 includes a controller unit (control unit) 100 that controls the apparatus as a whole, a console unit 106, a scanner 112, and a printer 114. The console unit 106 includes a numeric keypad, various hardware keys, and the like for receiving input such as an instruction for job execution from a user, and further includes a display panel for displaying apparatus information, job progress information, and the like to the user, or a settings screen for functions executable by the image forming apparatus 1000. The scanner 112 optically reads an image on an original document being set, and outputs the image as digital image data. The printer 114 prints an image on a printing medium (sheet), such as a print sheet, based on the image data.

The console unit 106 is connected to a console unit interface (I/F) 105 included in the controller unit 100. The scanner 112 and the printer 114 are respectively connected to a scanner processing unit 111 and a printer processing unit 113 included in the controller unit 100. With such a configuration, each of the console unit 106, the scanner 112, and the printer 114 operates under the control by the controller unit 100.

If necessary, an external storage apparatus 116 such as a USB memory medium can be connected to the image forming apparatus 1000. In such a case, the external storage apparatus 116 is connected via an external storage I/F 115, and performs a data reading/writing operation under control by the controller unit 100.

The controller unit 100 includes a central processing unit (CPU) 101 that comprehensively controls each block of the controller unit 100. The CPU 101 is connected to a random access memory (RAM) 102, a read only memory (ROM) 103, a hard disk drive (HDD) 104, the console unit I/F 105, a network I/F 107, an image processing unit 109, a device I/F 110, and the external storage I/F 115, via a system bus 117. The RAM 102 is a general-purpose RAM, and serves as a memory for providing a work area for the CPU 101. Further, the RAM 102 is also used as a memory for temporarily storing parameters, setting values, and the like, and an image memory for storing image data in predetermined units, such as pages. The ROM 103 is a general-purpose ROM, and serves as a boot ROM for example to store a system boot program. The HDD 104 stores system software programs, log data, tables, and the like. The functions of the image forming apparatus 1000 are implemented by, for example, the CPU 101 deploying a program, stored in the ROM 103 or the HDD 104, onto the RAM 102, and executing the program. The console unit I/F 105 is an interface for performing input and output of information between the controller unit 100 and the console unit 106. The console unit I/F 105 outputs display data to the console unit 106 in accordance with an instruction from the CPU 101, and transmits information input by the user on the console unit 106 to the CPU 101.

The network I/F 107 is connected to a local area network (LAN) 108 of wired or wireless media, and enables input and output of information between the image forming apparatus 1000 and devices on the LAN 108. The network I/F 107 has a configuration corresponding to the LAN 108, and may have, for example, a configuration corresponding to near field communication with a wireless range of about several tens of cm. In such a case, mutual communications can be performed with a mobile wireless terminal.

The image processing unit 109 executes general image processing. For example, the image processing unit 109 executes processing such as scaling, rotation, and conversion on image data obtained from the outside via the LAN 108, for example. Furthermore, the image processing unit 109 executes processing of rendering page-description language (PDL) data, received via the LAN 108, into bitmap image data. Additionally, when printing is performed using the printer 114 via the printer processing unit 113, the image processing unit 109 executes processing for formatting the image data compressed, encoded, and stored in the RAM 102 into a format processable by the printer processing unit 113.

The device I/F 110 is connected to the scanner 112 and the printer 114 via the scanner processing unit 111 and the printer processing unit 113, respectively, and is in charge of image data synchronous/asynchronous conversion, and transmission of a setting value, an adjusted value, and the like. The device I/F 110 also transmits status information of the scanner 112 and the printer 114 to the CPU 101. The status information includes, for example, error information such as a jam that occurred in the scanner 112 or the printer 114.

The scanner processing unit 111 performs various processing corresponding to scanning functions such as correction, modification, region separation, magnification, binarization processing, and the like, on read data read and input by the scanner 112. The scanner 112 includes an auto document feeder and a reading unit through platen (not illustrated) and can execute reading from an original document fed or placed on a document glass platform, both sides of a plurality of original documents, and the like. The scanner 112 is provided with sensors configured to detect opening/closing of a feeder cover (not illustrated), opening/closing of a document cover (not illustrated), the presence or absence of an original document, and a size of an original document, and the like. The detection signals from these sensors and the status information of the scanner 112 are transmitted to the CPU 101 via the scanner processing unit 111 and the device I/F 110, and thus the CPU 101 recognizes status of the scanner 112, such as error occurrence and error recovery.

The printer processing unit 113 performs processing on the image data to be printed output in accordance with printing functions such as output correction corresponding to output characteristics of the printer 114, resolution conversion, and adjustment of the printing position of the image. The printer 114 includes one or more paper cassettes (not illustrated) for accommodating print sheets, one or more toner trays (not illustrated) for accommodating toner, and a feed unit (not illustrated) configured to sequentially feed a sheet one by one from the paper cassettes. A marking unit (not illustrated) for printing on a fed sheet using toner and a fixing unit (not illustrated) for fixing a toner image, printed by the marking unit, using heat and pressure are further provided. The printer 114 is provided with sensors configured to detect an opening/closing status of each paper cassette and a remaining amount of sheets therein, an opening/closing status of the toner tray, opening/closing of a cover of the feed unit (not illustrated), presence/absence of toner, the position of the sheet being fed, and the like. The detection signals from the sensors and the status information of the printer 114 are transmitted to the CPU 101 via the printer processing unit 113 and the device I/F 110, and thus the CPU 101 recognizes status of the printer 114, such as error occurrence and error recovery.

While being connected with the external storage apparatus 116, the external storage I/F 115 reads data stored in the external storage apparatus 116 and writes data to the external storage apparatus 116, in response to an instruction from the CPU 101.

Figure 2:
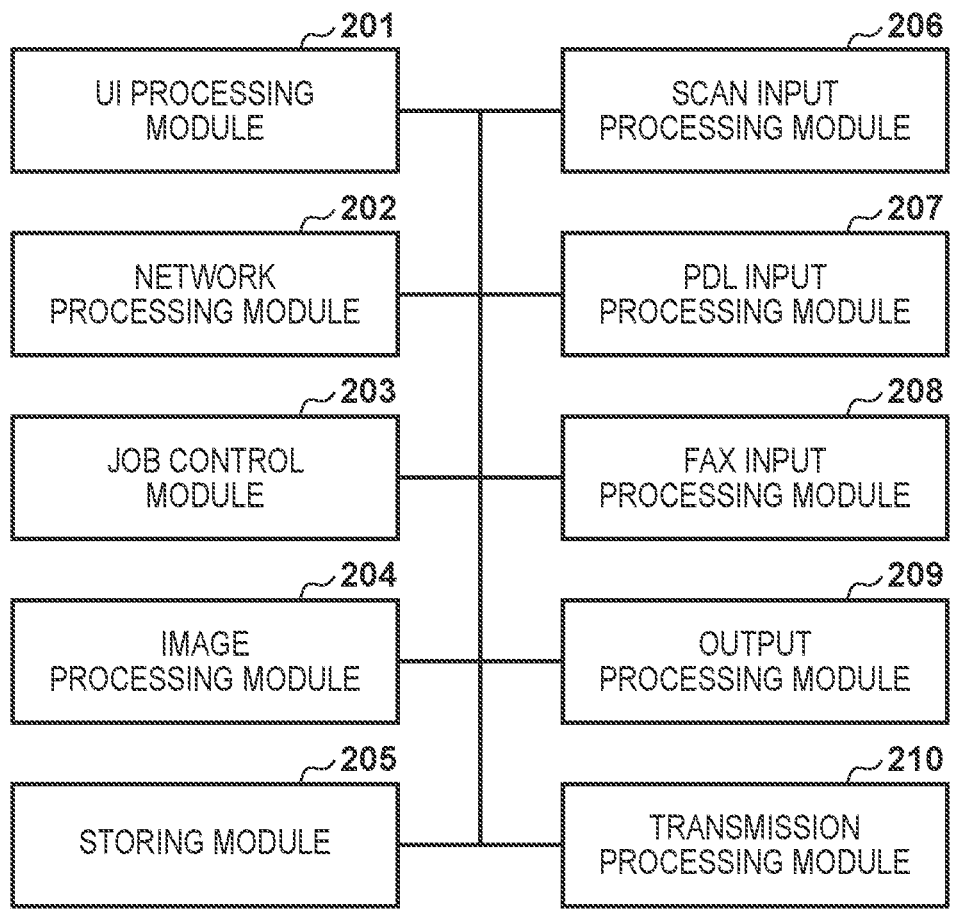
FIG. 2 is a diagram for describing a software module of the image forming apparatus according to the embodiment.

FIG. 2 is a diagram for describing a software module of the image forming apparatus 1000 according to the embodiment. Each module illustrated in FIG. 2 is implemented by executing the program deployed onto the RAM 102 by the CPU 101 as described above.

A UI processing module 201 performs processing related to the console unit I/F 105 and the console unit 106. The UI processing module 201 notifies other modules of the operation on the console unit 106 made by the user as necessary and causes a display of the console unit 106 to display a screen in accordance with an instruction from other modules. Furthermore, the UI processing module 201 performs editing of drawing data for displaying an image on the display of the console unit 106, and the like.

A network processing module 202 performs communication processing with the devices on the LAN 108 via the network I/F 107. Upon receiving control commands and data from the devices on the LAN 108, the network processing module 202 notifies other modules of these pieces of information. The network processing module 202 transmits control commands and data to the devices on the LAN 108 in accordance with an instruction from other modules.

A job control module 203 controls other modules, and comprehensively controls execution of each job generated in the image forming apparatus 1000 such as copying, printing, and faxing. When a job is input from the UI processing module 201 or the network processing module 202, the job control module 203 determines the type of the job, and instructs an input processing module suitable for the type to execute processing of generating an image for printing, for example. For example, execution is instructed to a scan input processing module 206 when a copy job is input, and to a PDL input processing module 207 when PDL data is input. The scan input processing module 206 and the PDL input processing module 207 generate image data for each page and store the image data in a storing module 205, and then make a notification to the job control module 203. Upon receiving the notification, the job control module 203 instructs an output processing module 209 to execute processing of printing the image data on a printing medium (sheet). This series of control is repeated for the number of pages of the job to implement the printing of an image.

An image processing module 204 performs a process related to the image processing unit 109 in FIG. 1. The image processing module 204 performs image processing by software or image processing by hardware using the image processing unit 109 in accordance with an instruction from each of the input processing modules 206, 207 and the output processing module 209.

The storing module 205 reads data from the RAM 102 and the HDD 104, and writes data to them. The storing module 205 stores job settings and image data in accordance with an instruction from other modules.

The scan input processing module 206 controls the scanner processing unit 111 and the scanner 112 in accordance with an instruction from the job control module 203 to execute processing of reading the original document placed in the scanner 112. The scan input processing module 206 controls the scanner processing unit 111 to execute image processing on the image data obtained by reading the original document. The scan input processing module 206 obtains status information of the scanner processing unit 111 and the scanner 112, and notifies the job control module 203 of the information. In a case where the scan input processing module 206 receives an interruption instruction described later from the job control module 203, the scan input processing module 206 can interrupt the processing of reading the original document and the processing of generating the image data.

In accordance with an instruction from the job control module 203, the PDL input processing module 207 analyzes the PDL data received via the network processing module 202, and performs processing of rendering page by page into the bitmap image data. The bitmap image data obtained in this manner is stored in a storage area such as the HDD 104 and the RAM 102 by the storing module 205. In a case that the PDL input processing module 207 receives the interruption instruction described later from the job control module 203, the PDL input processing module 207 can interrupt the processing of analyzing the PDL data and the processing of generating the image data.

A facsimile input processing module 208 performs processing of converting page by page the data received via the network processing module 202 into binary image data in accordance with an instruction from the job control module 203. The binary image data obtained in this manner is stored in a storage area such as the HDD 104 and the RAM 102 by the storing module 205.

The output processing module 209 controls the image processing module 204, the printer processing unit 113, and the printer 114 in accordance with an instruction from the job control module 203 to perform appropriate image processing on the image data generated by each input processing module and perform processing of printing the image data on the printing medium. The output processing module 209 obtains status information of the printer processing unit 113 and the printer 114 and notifies the job control module 203 of the status information. The output processing module 209 does not perform printing processing for another job while performing printing processing for a certain job, but may interrupt the processing for the job during printing and start the processing for the other job only when it receives an update notification of priority described later from the job control module 203.

The transmission processing module 210 controls the image processing module 204 and the network processing module 202 in accordance with an instruction from the job control module 203 and transmits the image data to the devices on the LAN 108.

Figure 3:
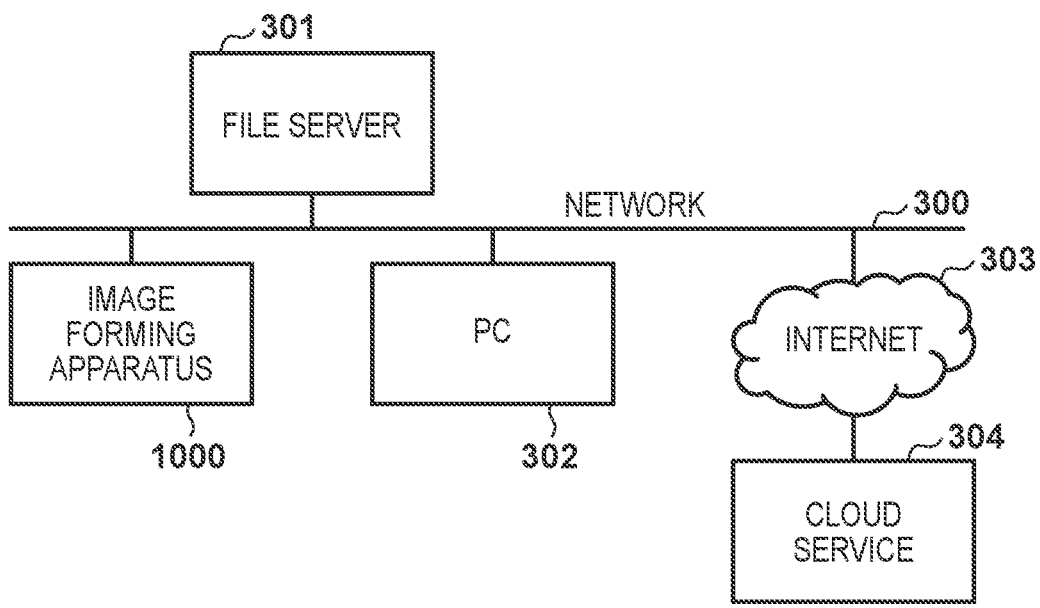
FIG. 3 is a diagram for describing a configuration of a printing system according to the embodiment.

FIG. 3 is a diagram for describing a configuration of a printing system according to the embodiment.

Here, as examples of communication destinations of the image forming apparatus 1000, a file server 301 and a cloud service 304 are illustrated. The image forming apparatus 1000, the file server 301, and a PC 302 are communicatively connected to each other on a network 300. The network 300 and the Internet 303 are connected, and the image forming apparatus 1000 and the cloud service 304 can communicate with each other via these networks.

As an example below, an application "cloud cooperative printing and scanning" is described in which a communication destination is the cloud service 304.

Figure 4:
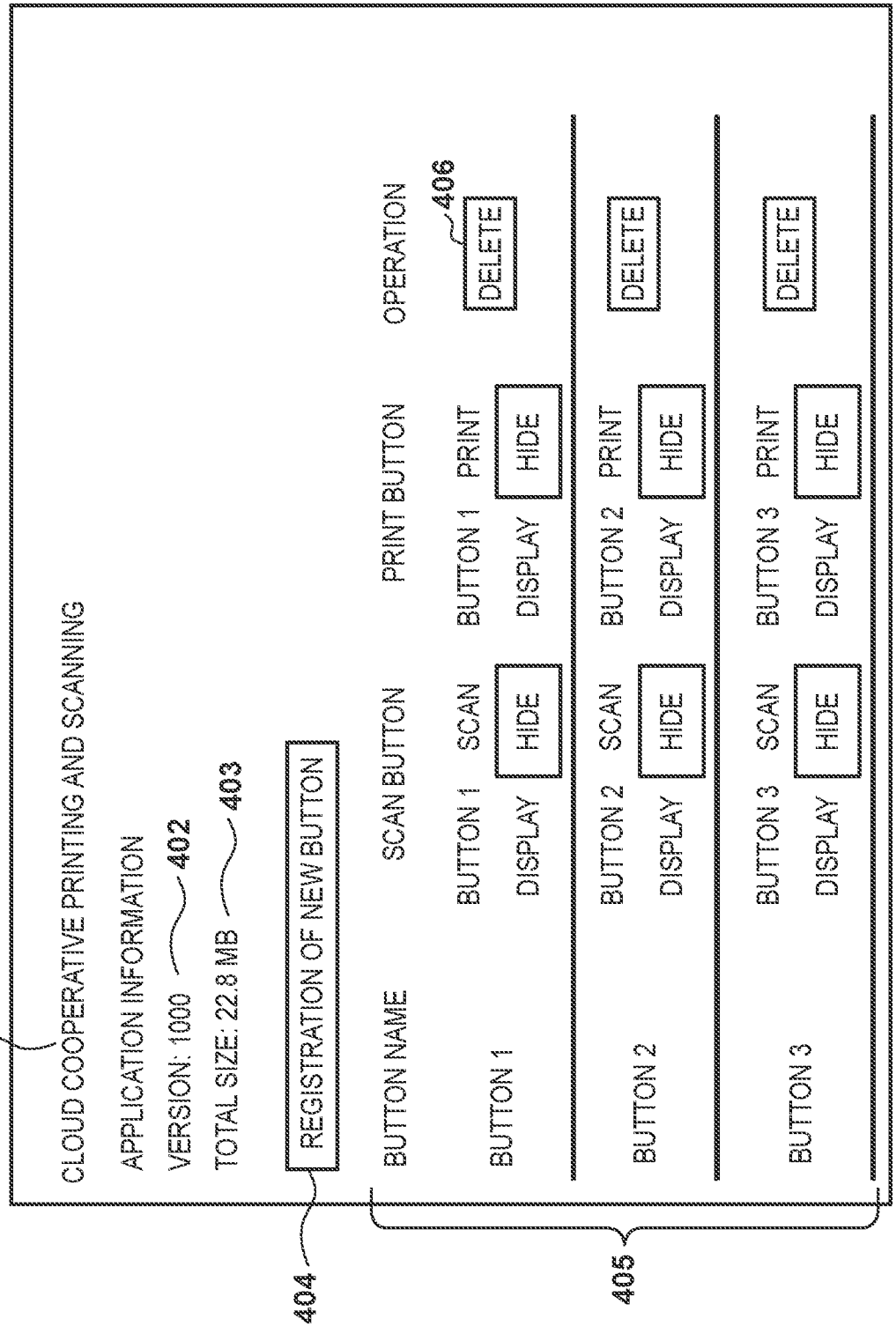
FIG. 4 is a diagram illustrating an example of a management screen displayed by a cloud cooperative printing and scanning application installed in the image forming apparatus according to the embodiment.

FIG. 4 is a diagram illustrating an example of a management screen displayed by a cloud cooperative printing and scanning application installed in the image forming apparatus 1000 according to the embodiment. By accessing the image forming apparatus 1000 from a browser of such as the PC 302, this screen is displayed on the PC 302.

An application name 401 is an area for displaying an application name, and a name "cloud cooperative printing and scanning" is displayed here. The cloud cooperative printing and scanning is an application for transmitting image data obtained by scanning to the cloud or for printing data stored in the cloud, based on the predetermined setting. A plurality of settings (also referred to as button settings) can be registered, and cloud setting, scan setting, and print setting of the communication destination for each of the settings can be switched.

Version information 402 is an area for displaying the version of this application. Size information 403 is an area for displaying the size of a storage area used by this application. A "registration of new button" button 404 is a button for newly registering setting information on a displayed button corresponding to the cloud cooperative printing and scanning application. When the button 404 is pressed, a transition to a button setting editing screen described below with reference to FIG. 5 takes place. A list of button settings 405 is an area for displaying a list of the setting information on buttons registered. Here, one setting information is displayed in two rows, and representative button names, scan button names and display setting (displayed/hidden), and print button names and display setting (displayed/hidden) can be confirmed. A delete button 406 for deleting the setting information on a button that becomes unnecessary is also displayed for each button setting. On this screen, three button settings, that is, "Button 1", "Button 2", and "Buttons 3" are registered as the representative button names, and the following description is given on this premise.

Figure 5:
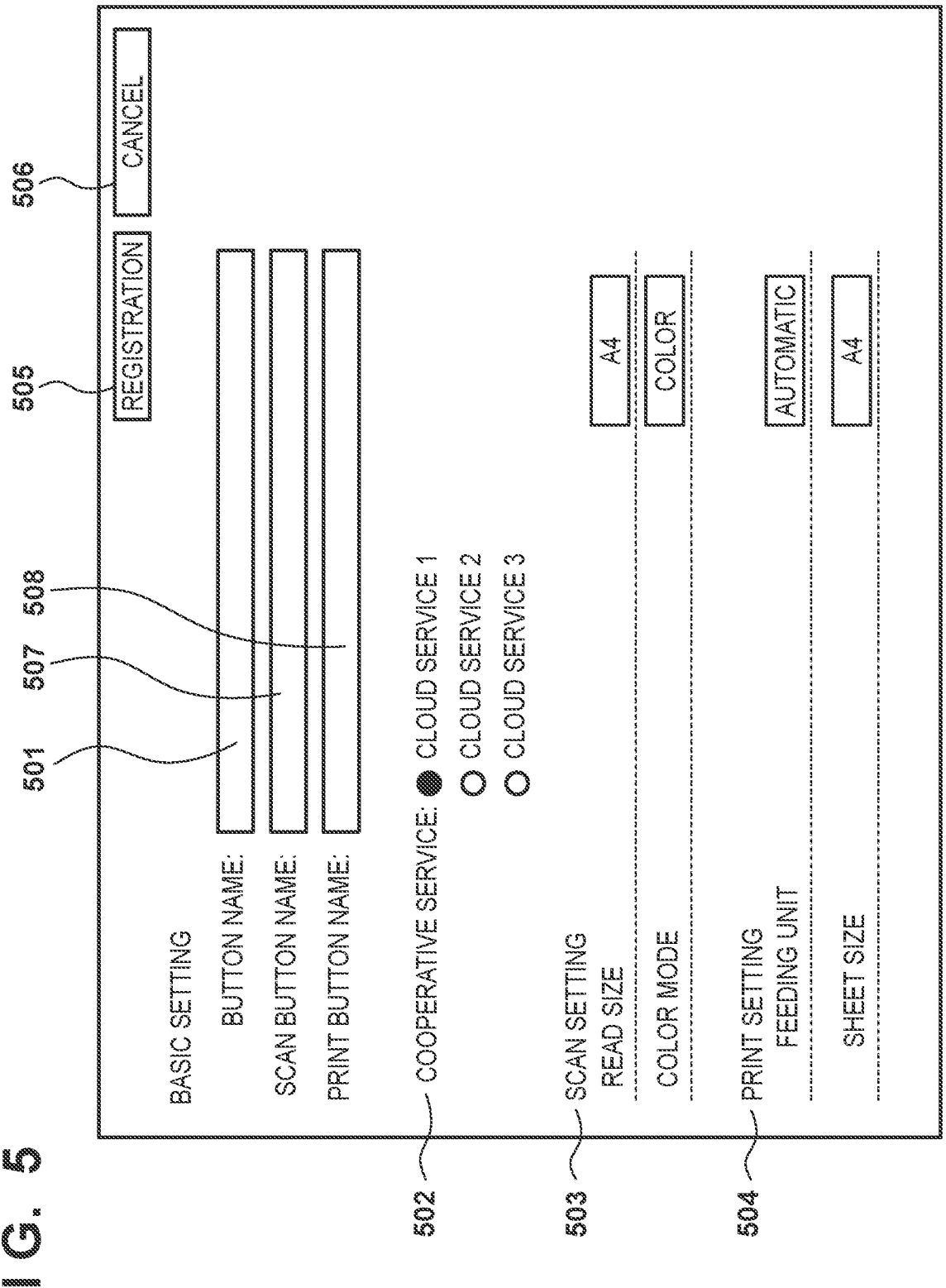
FIG. 5 is a diagram illustrating an example of an editing screen of setting information on a button by the application (cloud cooperative printing and scanning) according to the embodiment.

FIG. 5 is a diagram illustrating an example of an editing screen of the setting information on a button by the application (cloud cooperative printing and scanning) according to the embodiment. This screen is displayed when the "registration of new button" button 404 in FIG. 4 is pressed.

A button name input field 501 is an area for inputting any button name. The button name input here is used as a button name in the list of button settings 405 described above. A scan button name input field 507 is an area for inputting any scan button name instructing scanning. This is used as the name of a scan button described below. A print button name input field 508 is an area for inputting any print button name instructing printing. This is used as the name of a print button described below. Here, to display a total of two displayed buttons, that is, a scan button for executing scanning and a print button for executing printing, on a home screen in FIG. 6 described later, each button name can be set to be distinguished from each other. A cooperative service selection field 502 is an area for selecting a cloud service that is intended to be a communication destination. While cloud service 1 to cloud service 3 are displayed as an example in the present embodiment, a service that can be selected may be changed depending on the embodiment. On the screen in FIG. 5, "cloud service 1" is selected as a cooperation destination.

A scan setting field 503 is an area for performing setting for scanning. A read size, a color mode, and the like are displayed as an example in the embodiment, the setting items may be changed depending on the embodiment. A print setting field 504 is an area for performing setting for printing. A feeding unit, a sheet size, and the like are displayed as an example in the present embodiment, the setting items may be changed depending on the embodiment. A registration button 505 is a button for registering the setting information on the button with the settings set via the editing screen. When the registration button 505 is pressed, the setting information on the button input on this screen is stored in a storage area of this cloud cooperative printing and scanning application (cloud cooperative application). Based on this setting information, two buttons corresponding to the home screen of the image forming apparatus 1000 described later (a button for scanning and a button for printing) are displayed.

Depending on the cloud service selected, user authentication may be required. Thus, after the registration button 505 is pressed, a transition to an authentication screen provided by the cloud service selected may take place. However, in the embodiment, description of the authentication screen and an authentication method is omitted. A cancel button 506 is a button for canceling registration of the setting information on the button on this screen. When the cancel button 506 is pressed, the settings set on this screen are not stored. This screen is then closed.

Figure 6:
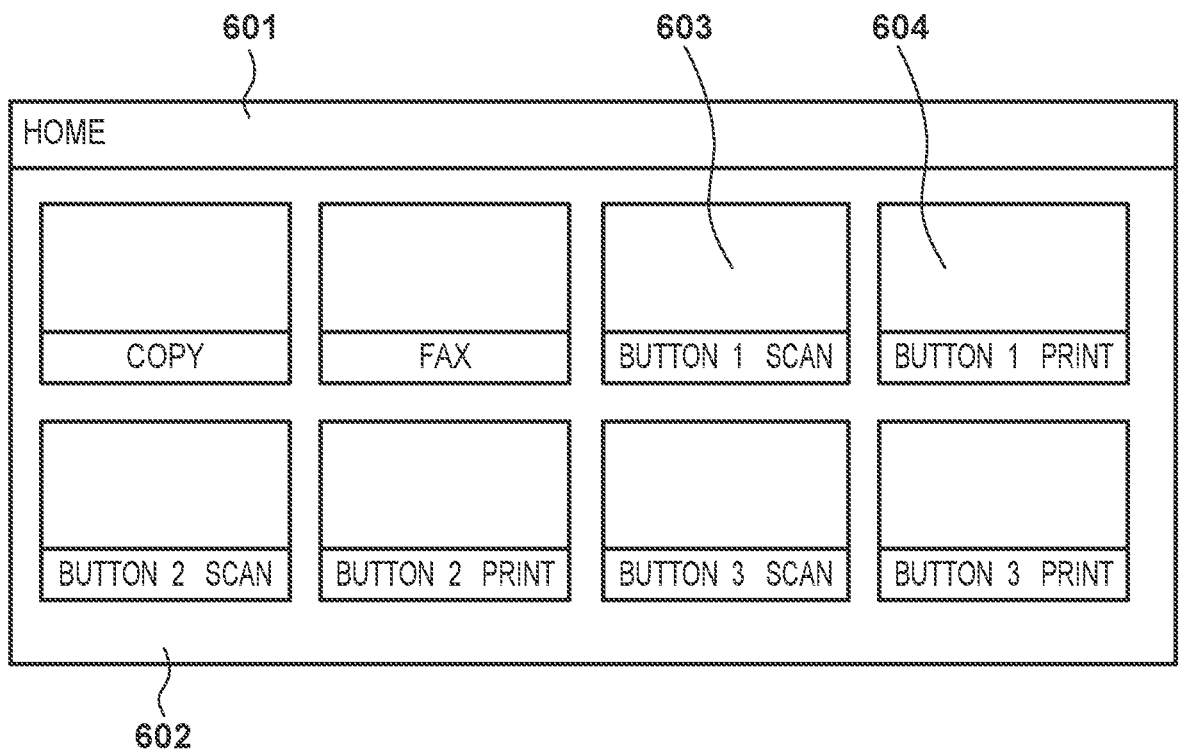
FIG. 6 is a diagram illustrating an example of a home screen displayed on a console unit of the image forming apparatus according to the embodiment.

FIG. 6 is a diagram illustrating an example of the home screen displayed on the console unit 106 of the image forming apparatus 1000 according to the embodiment.

A screen name 601 is an area for displaying the name of the currently displayed screen. Here, "home" indicating the home screen is displayed. A button display area 602 is an area for displaying displayed buttons serving as triggers for executing functions of the image forming apparatus 1000. Each button displayed is associated with a specific function of the image forming apparatus 1000 (such as copying or facsimile, for example). A user can press any of these displayed buttons to cause a desired function corresponding to the button to be executed. A cloud cooperative printing and scanning button 603 is a scan button corresponding to "Button 1" in FIG. 4. When this button 603 is pressed, scanning is executed in accordance with scan setting of "Button 1", and scan data is transmitted to the cloud service set for "Button 1". A cloud cooperative printing and scanning button 604 is a print button corresponding to "Button 1" in FIG. 4. When this button 604 is pressed, data stored in the cloud service set for "Button 1" is downloaded, and the data is printed in accordance with the print setting of "Button 1". That is, these displayed buttons 603 and 604 correspond to a case where "Button name 1" is input in the button name input field 501, "Scan" is input in the scan button name input field 507, and "Print" is input in the print button name input field 508 on the screen in FIG. 5. The other displayed buttons displayed in FIG. 6 also correspond to "Button 2" or "Button 3" in FIG. 4.

The displayed buttons generated by the application (cloud cooperative printing and scanning) according to the embodiment are generated with the names input in the button name input field 501, the scan button name input field 507, and the print button name input field 508 in FIG. 5. In addition, the icon designs for the scan button and the print button may be changed to easily distinguish them from each other. For example, an icon (not illustrated) indicating a cloud service that is set may be displayed. In this case, an icon table for each cloud service type and function as illustrated in FIG. 8 may be provided, so that an icon to be read can be switched in accordance with the setting.

FIG. 8 is a diagram for describing an example of a table for storing the setting information on an icon corresponding to the cloud service and the scanning function and the printing function of the image forming apparatus 1000 according to the embodiment.

In the example in FIG. 8, icons corresponding to scanning and printing for each of "Cloud service 1" to "Cloud service 3" of the cooperative service on the screen in FIG. 5 are identified.

Figure 7:
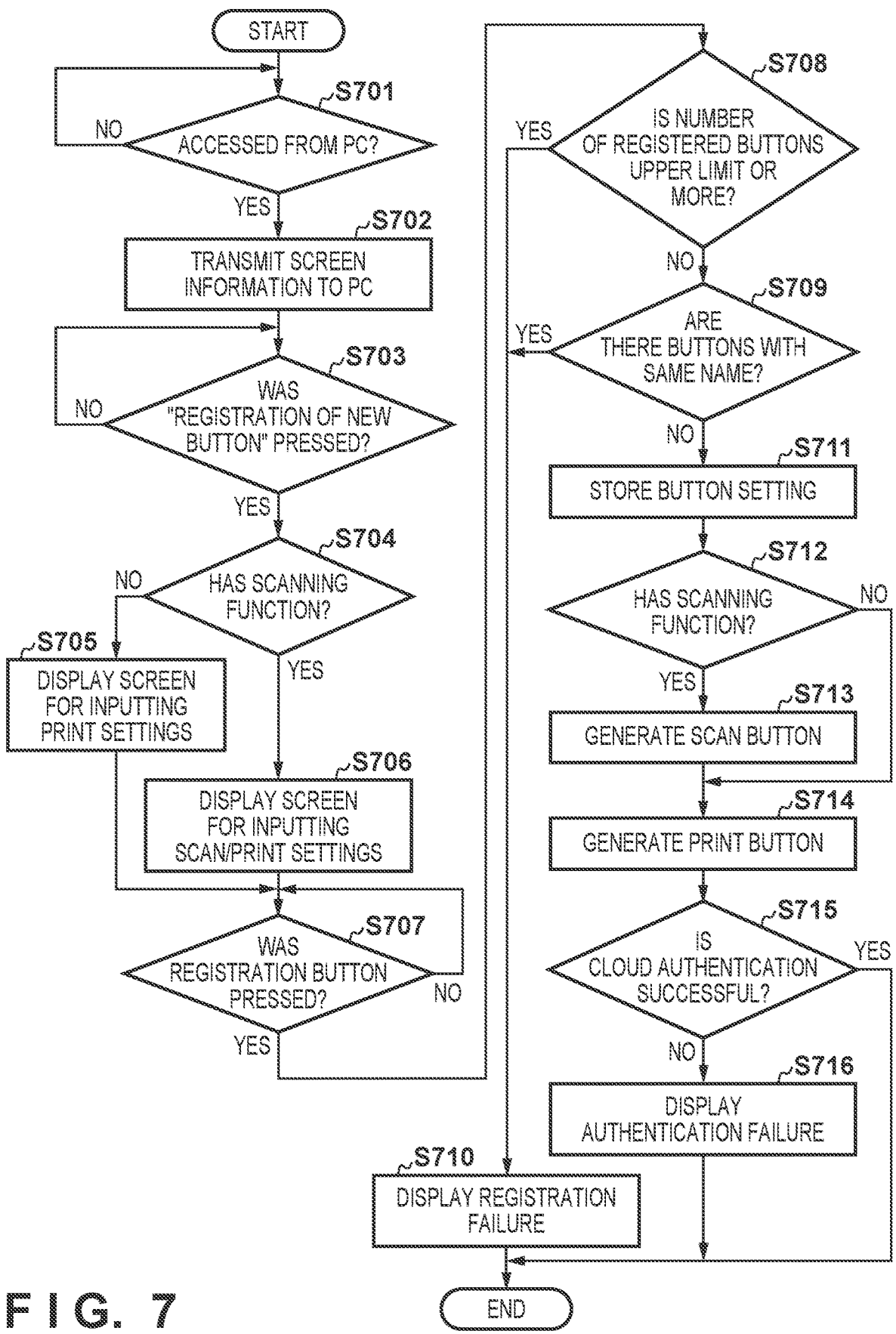
FIG. 7 is a flowchart for describing processing that starts when the image forming apparatus according to the embodiment executes the cloud cooperative printing and scanning application, and ends when the image forming apparatus generates a displayed button displayed on the home screen.

FIG. 7 is a flowchart for describing processing that starts when the image forming apparatus 1000 according to the embodiment executes the cloud cooperative printing and scanning application, and ends when the image forming apparatus 1000 generates a displayed button displayed on the home screen. The processing described in this flowchart is implemented by executing the program deployed onto the RAM 102 by the CPU 101 as described above, for example.

First of all, the CPU 101 determines whether an access from the browser of the PC 302 has been made via the network I/F 107 in step S701, and the processing proceeds to step S702 when the access has been made. This is because the browser needs to be used for displaying the cloud cooperative printing and scanning management screen illustrated in FIG. 4 as described above. Next, when the processing proceeds to step S702, the CPU 101 transmits, as a response, HTML data (screen information) for displaying the cloud cooperative printing and scanning management screen illustrated in FIG. 4 for example, to the PC 302. Specifically, the HTML data of the management screen is transmitted, as a response, to the PC 302, via the network I/F 107. As a result, the browser of the PC 302 interprets the HTML, and displays the management screen on the display of the PC 302.

Next, the processing proceeds to step S703, and the CPU 101 waits for the "registration of new button" button 404 on the screen illustrated in FIG. 4 to be pressed by the user of the PC 302. When the button 404 is pressed, the processing proceeds to step S704. In step S704, the CPU 101 determines whether the scanning function is available, based on the configuration of the image forming apparatus 1000. Here, the image forming apparatus 1000 is assumed to be always equipped with the printing function. Since the image forming apparatus of a certain model is not equipped with the scanner, the display needs to be switched depending on the model configuration (for example, anything related to the copying function is hidden). Whether the scanning function is equipped can be determined based on whether the scanner is installed, which can be determined by referring to the setting value stored in the RAM 102 in advance. When the scanning function is unavailable, the processing proceeds to step S705. When the scanning function is available, the processing proceeds to step S706.

In step S705, the CPU 101 transmits, to the PC 302, the HTML data for displaying a button setting editing screen for the cloud cooperative printing and scanning described with reference to FIG. 5, to make the display of the PC 302 display the screen. Then, the processing proceeds to step S707. In this route, due to the absence of the scanning function, the scan button name input field 507 and the scan setting field 503 are hidden in step S705. On the other hand, in step S706, the CPU 101 transmits, to the PC 302, the HTML data for displaying the button setting editing screen for the cloud cooperative printing and scanning illustrated in FIG. 5, to make the PC 302 display the screen. Then, the processing proceeds to step S707. Thus, in step S706, the screen illustrated in FIG. 5 is displayed that includes the scan button name input field 507 and the scan setting field 503 in addition to the print button and the print settings.

In step S707, the CPU 101 waits for the registration button 505 on the screen displayed on the PC 302 to be pressed by the user. The processing proceeds to step S708 when the registration button 505 is pressed. Note that it is assumed in step S707 that the input of various setting items has been already completed.

In step S708, the CPU 101 determines whether the number of registered buttons has reached the upper limit value. When the upper limit value is determined to have been reached, the processing proceeds to step S710. When the upper limit value is determined to have not been reached yet, the processing proceeds to step S709. In step S709, the CPU 101 determines whether there are buttons with the same name. When there are the buttons with the same name, the processing proceeds to step S710. When there are no buttons with the same name, the processing proceeds to step S711. In step S710, the CPU 101 transmits, to the PC 302, HTML, data for displaying a button setting registration failure screen (not illustrated), to make the PC 302 display the screen. Then, the processing ends. On the registration failure screen, a cause of the error corresponding to the screen displayed before the transition to the failure screen is displayed.

In step S711, the CPU 101 stores button setting information, input using the setting editing screen, in the HDD 104. The information is stored with a unique ID (identification information) assigned to each button setting. Next, the processing proceeds to step S712, and the CPU 101 determines whether the image forming apparatus 1000 is equipped with the scanner function, in a manner similar to that in in step S704 (the same processing as in step S704). When it is determined that the scanner function is equipped in step S712, the processing proceeds to step S713. On the other hand, when it is determined that the scanner function is not equipped, the processing skips step S713, and proceeds to step S714. In step S713, the CPU 101 generates scan button display data, corresponding to the button setting information stored in step S711, and arranges the data in the home screen illustrated in FIG. 6. Then, the processing proceeds to step S714. An internally unique ID (identification information) is set to the scan button display data thus generated. In the embodiment, this ID is a value added "1" to the value obtained by multiplying the unique ID for each button described above by 10, as shown in FIG. 10. However, the present invention is not limited to this. In step S714, the CPU 101 generates display data for a print button corresponding to the button setting information stored in step S711, and arranges the data in the home screen illustrated in FIG. 6 for example. An internally unique ID is set to the button thus generated, as in the case of the scan button described above. In the embodiment, this ID is a value added "2" to the value obtained by multiplying the unique ID for each button setting information described above by 10 as shown in FIG. 10. However, the present invention is not limited to this.

Then, the processing proceeds to step S715, and the CPU 101 performs authentication for the cooperative cloud service being set. When the authentication is successful, the processing ends. When the authentication fails, the processing proceeds to step S716. In step S716, the CPU 101 transmits, to the PC 302, HTML, data for displaying an authentication failure screen, to make the PC 302 display the screen. Then, the processing ends.

Figure 9:
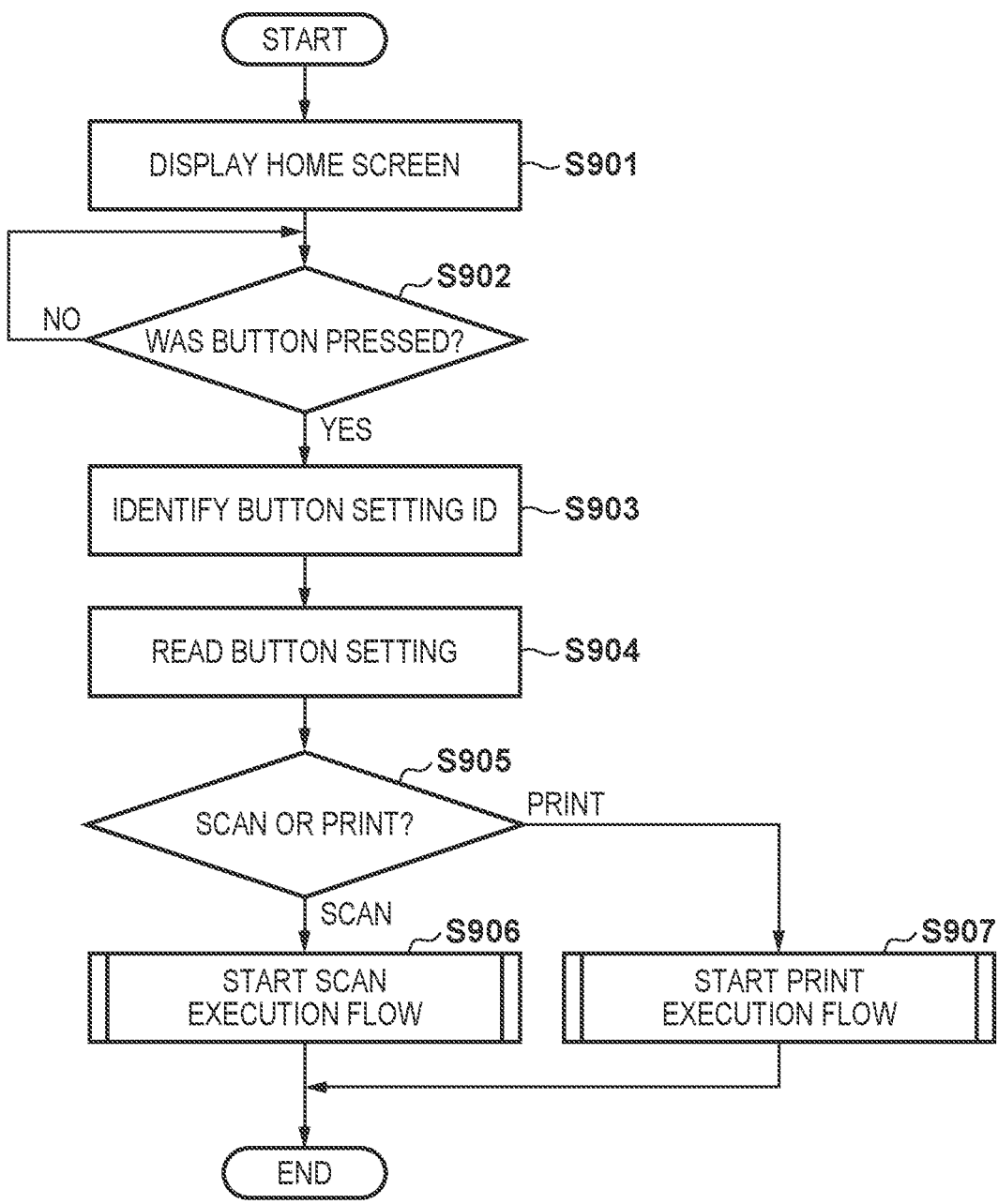
FIG. 9 is a flowchart for describing processing executed in the image forming apparatus according to the embodiment, when a button is pressed after the home screen has been displayed.

FIG. 9 is a flowchart for describing processing executed in the image forming apparatus 1000 according to the embodiment, when a button is pressed after the home screen has been displayed. The processing described in this flowchart is implemented by executing the program deployed onto the RAM 102 by the CPU 101 as described above, for example.

First of all, in step S901, the CPU 101 displays the home screen as illustrated in FIG. 6 for example, on the display of the console unit 106. Then, the processing proceeds to step S902, and the CPU 101 accepts the pressing of a displayed button from the user via the home screen. In the embodiment, a description is given assuming that the cloud cooperative printing and scanning button 603 in FIG. 6 is pressed. Then, the processing proceeds to step S903, and the CPU 101 identifies the button set ID set to the pressed button.

FIG. 10 is a diagram illustrating an example of a list of setting information pieces on the buttons of the cloud cooperative printing and scanning application displayed on the home screen of the image forming apparatus 1000 according to the embodiment and the IDs of the buttons displayed on the home screen.

The image forming apparatus 1000 does not actually store therein the table as illustrated, but stores the button set names and the button set IDs only. As described above with reference to step S713 and step S714, in the embodiment, the scan button ID and the print button ID are generated from the button set ID and are associated with the buttons being displayed. Accordingly, the button set ID is an integer portion of the quotient of dividing the scan button ID or the print button ID by 10.

For example, the cloud cooperative printing and scanning button 603 illustrated in FIG. 6 is the scan button corresponding to the button 1, meaning that a button with the scan button ID "11" is currently pressed. Thus, the button set ID is "1". Note that, when the scan button ID and the print button ID are generated in a different manner in step S713 and step S714, the button set ID is identified in a different manner in this step.

Next, the processing proceeds to step S904, and based on the button set ID identified in step S903, the CPU 101 reads the button setting information set to the button. Then, the processing proceeds to step S905, and the CPU 101 determines which one of the scanning and printing is to be executed. In step S905, the CPU 101 divides the button ID identified in step S903 by 10, and obtains the remainder. When the remainder is "1", "1" is the scanning, and the processing proceeds to step S906. On the other hand, when the remainder is "2", "2" is the printing, and the processing proceeds to step S907. Note that, when the scan button ID and the print button ID are generated in a different manner in step S713 and step S714, the determination is made in a different manner in this step. In step S906, the CPU 101 executes the cloud cooperative scanning based on the button setting read in step S904. Note that, since this processing is outside the scope of the present invention, the detailed description thereof will be omitted. On the other hand, in step S907, the CPU 101 executes the cloud cooperative printing based on the button setting read in step S904. Note that this processing is also outside the scope of the present invention, and thus detailed description thereof will be omitted.

As described above, according to the embodiment, with an application that can execute the functions of the image forming apparatus, buttons corresponding to the number of executable functions can be displayed on the home screen for each button setting registered. The user can selectively execute the desired function, by pressing the button of the desired function, among the buttons displayed.

Although the cloud cooperative printing and scanning is described as the application that can execute the two functions of scanning and printing in the above described embodiment, the same concept can be applied to an application that can execute three or more functions.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-033731, filed Mar. 3, 2021, which is hereby incorporated by reference herein in its entirety.

What is claimed is:

1. An image forming apparatus having a plurality of functions and being configured to execute an application, the image forming apparatus comprising:
   at least one memory configured to store instructions; and
   at least one processor configured to execute the instructions stored in the at least one memory to:
   receive setting information including settings with which at least two of the plurality of functions of the image forming apparatus are used;
   register, as setting information on display buttons corresponding to the application, the received setting information including the settings with which the at least two of the plurality of functions of the image forming apparatus are used;
   generate, based on the registered setting information, display buttons corresponding to the application, the generated display buttons respectively corresponding to one of the at least two of the plurality of functions of the image forming apparatus included in the setting information;
   display the generated display buttons on a first screen; and
   control to execute, when a first display button of the generated display buttons is selected via the first screen, the application corresponding to the first display button, based on the setting information corresponding to the first display button, to thereby execute one of the at least two plurality of functions of the image forming apparatus corresponding to the first display button.

2. The image forming apparatus according to claim 1, wherein the at least one processor is configured to execute the instructions stored in the at least one memory to:
in the registering, transmit screen information for displaying a second screen for registering the setting information to an external apparatus, and register the setting information based on setting information input via the second screen displayed on the external apparatus.

3. The image forming apparatus according to claim 1, wherein the at least one processor is configured to execute the instructions stored in the at least one memory to:
in the registering, be able to register setting information for setting all functions usable by the application, among the plurality of functions of the image forming apparatus.

4. The image forming apparatus according to claim 1, wherein the setting information includes information for setting to display or hide the generated display buttons.

5. The image forming apparatus according to claim 1, wherein the at least one processor is configured to execute the instructions stored in the at least one memory to:
in the generating, generate no display button corresponding to a function not executable by the image forming apparatus.

6. The image forming apparatus according to claim 1, wherein the at least one processor is configured to execute the instructions stored in the at least one memory to:
in the controlling, identify a function corresponding to the first display button based on a button set ID of the first display button, and control to execute the application corresponding to the first display button based on the setting information.

7. The image forming apparatus according to claim 1, wherein the plurality of functions include at least one of printing and scanning.

8. The image forming apparatus according to claim 1, wherein the first screen is a home screen.

9. The image forming apparatus according to claim 1, wherein the application is an application that executes processing in cooperation with an external apparatus.

10. The image forming apparatus according to claim 1, wherein the application is a cloud cooperative application that cooperates with a cloud to execute processing.

11. The image forming apparatus according to claim 10, wherein the at least one processor is configured to execute the instructions stored in the at least one memory to:
in a case where the cloud requires authentication, display the generated display buttons on the first screen when the authentication is successful.

12. The image forming apparatus according to claim 1, wherein the at least one processor is configured to execute the instructions stored in the at least one memory to:
cause a setting registration screen to be displayed, the setting registration screen being configured to receive the setting information including the settings with which the at least two of the plurality of functions of the image forming apparatus are used; and
register the setting information including the settings with which the at least two of the plurality of functions of the image forming apparatus are used in response to an instruction to register the setting information received by the image forming apparatus via the setting registration screen.

13. The image forming apparatus according to claim 12, wherein the application is an application that executes processing in cooperation with an external apparatus; and
wherein the at least one processor is configured to execute the instructions stored in the at least one memory to cause the setting registration screen to be displayed on the external apparatus.

14. The image forming apparatus according to claim 1, wherein the at least one processor is configured to execute the instructions stored in the at least one memory to simultaneously register the received setting information including the settings with which the at least two of the plurality of functions of the image forming apparatus are used.

15. A method of controlling an image forming apparatus having a plurality of functions and configured to execute an application, the method comprising:
receiving setting information including settings with which at least two of the plurality of functions of the image forming apparatus are used;
registering, as setting information on display buttons corresponding to the application, the received setting information including the settings with which the at least two of the plurality of functions of the image forming apparatus are used;
generating, based on the registered setting information, display buttons corresponding to the application, the generated display buttons respectively corresponding to one of the at least two of the plurality of functions of the image forming apparatus included in the setting information;
displaying the generated display buttons on a first screen; and
controlling to execute, when a first display button of the generated display buttons is selected via the first screen, the application corresponding to the first display button, based on the setting information corresponding to the first display button, to thereby execute one of the at least two plurality of functions of the image forming apparatus corresponding to the first display button.

16. The method according to claim 15, wherein, in the registering, screen information for displaying a second screen for registering the setting information is transmitted to an external apparatus, and the setting information is registered based on setting information input via the second screen displayed on the external apparatus.

17. A non-transitory computer-readable storage medium storing a program for causing a processor to execute a method of controlling an image forming apparatus having a plurality of functions and configured to execute an application, the method comprising:
receiving setting information including settings with which at least two of the plurality of functions of the image forming apparatus are used;
registering, as setting information on display buttons corresponding to the application, the received setting information including the settings with which the at least two of the plurality of functions of the image forming apparatus are used;
generating, based on the registered setting information, display buttons corresponding to the application, the generated display buttons respectively corresponding to one of the at least two of the plurality of functions of the image forming apparatus included in the setting information;
displaying the generated display buttons on a screen; and controlling to execute, when a first display button of the generated display buttons is selected via the screen, the application corresponding to the first display button, based on the setting information corresponding to the first display button, to thereby execute one of the at least two plurality of functions of the image forming apparatus corresponding to the first display button.

\* \* \* \* \*